United States Patent
Götz et al.

(10) Patent No.: US 10,527,401 B2
(45) Date of Patent: Jan. 7, 2020

(54) SENSOR AND METHOD FOR IDENTIFYING A MECHANICAL DEFORMATION OF A HOUSING OF A CHARGING COLUMN

(71) Applicant: Dr. Ing. h.c. F. Porsche Aktiengesellschaft, Stuttgart (DE)

(72) Inventors: Stefan Götz, Forstern (DE); David Köhler, Bietigheim-Bissingen (DE); Steve Zander, Marbach am Neckar (DE); Jari Rönfanz, Stuttgart (DE); Volker Reber, Michelbach an der Bilz (DE); Michael Kiefer, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 2 days.

(21) Appl. No.: 16/025,102

(22) Filed: Jul. 2, 2018

(65) Prior Publication Data
US 2019/0017801 A1 Jan. 17, 2019

(30) Foreign Application Priority Data
Jul. 11, 2017 (DE) .................. 10 2017 115 507

(51) Int. Cl.
*G01B 7/00* (2006.01)
*G01B 7/16* (2006.01)
(Continued)

(52) U.S. Cl.
CPC .............. *G01B 7/16* (2013.01); *B60L 53/30* (2019.02); *B60L 53/31* (2019.02)

(58) Field of Classification Search
CPC ............ G01B 7/16; B60L 53/31; B60L 53/30
(Continued)

(56) References Cited

U.S. PATENT DOCUMENTS

| 2010/0241299 A1* | 9/2010 | Ito ......................... B60L 53/18 701/22 |
| 2011/0187310 A1* | 8/2011 | Gochenaur ........... H01M 10/46 320/101 |

(Continued)

FOREIGN PATENT DOCUMENTS

| DE | 102011076183 A1 | 11/2012 |
| JP | 2010263666 A | 11/2010 |
| WO | 2013020284 A1 | 2/2013 |

OTHER PUBLICATIONS

Australian Examination Report for Australian Application No. 2018204417, dated Mar. 20, 2019, 5 pages.
(Continued)

*Primary Examiner* — Max H Noori
(74) *Attorney, Agent, or Firm* — RatnerPrestia

(57) ABSTRACT

A sensor for identifying a mechanical deformation of a housing of a charging column configured to charge an electrical energy store of an electrically driven vehicle. The sensor includes an elongated arm having a first end portion arranged in the longitudinal orientation and a second end portion opposite the first end portion in the longitudinal orientation. The arm is connected at its first end portion to a base of the charging column and runs in the longitudinal orientation approximately parallel to a part of the charging column that is sensitive to deformations of the housing, in particular to a side wall of the housing. An electrical probe element is arranged on the second end portion of the arm. An activation element is connected to the part of the charging column that is sensitive to deformations of the housing and is configured to activate the electrical probe element.

13 Claims, 4 Drawing Sheets

(51) Int. Cl.
 *B60L 53/31* (2019.01)
 *B60L 53/30* (2019.01)

(58) Field of Classification Search
 USPC .......................................................... 73/774
 See application file for complete search history.

(56) References Cited

U.S. PATENT DOCUMENTS

| | | | |
|---|---|---|---|
| 2013/0038285 A1* | 2/2013 | Hickox | H02J 7/025 320/109 |
| 2013/0193908 A1 | 8/2013 | Rivers, Jr. | |
| 2013/0193918 A1 | 8/2013 | Sarkar et al. | |
| 2013/0241479 A1 | 9/2013 | Wright et al. | |
| 2014/0077762 A1* | 3/2014 | Spanos | B60L 53/30 320/109 |
| 2014/0197792 A1* | 7/2014 | Weber | B60L 11/1818 320/109 |
| 2015/0123619 A1* | 5/2015 | Marathe | B60L 3/0023 320/137 |
| 2015/0210174 A1* | 7/2015 | Settele | B60L 11/1816 320/109 |
| 2016/0193932 A1 | 7/2016 | Vaghefinazari | |

OTHER PUBLICATIONS

Australian Examination Report for Australian Application No. 2018204417, dated Jul. 31, 2019, 4 pages.

* cited by examiner

SENSOR AND METHOD FOR IDENTIFYING A MECHANICAL DEFORMATION OF A HOUSING OF A CHARGING COLUMN

CROSS-REFERENCE TO RELATED APPLICATION

This application claims priority to German Patent Application No. DE 10 2017 115 507.4, filed Jul. 11, 2017, which is incorporated by reference herein in its entirety.

FIELD OF THE INVENTION

The present invention relates to a sensor and to a method for identifying a mechanical deformation of a housing of a charging column configured to charge an electrical energy store of an electrically driven vehicle. The present invention further relates to a corresponding method and to a charging column fitted with a sensor according to aspects of the invention.

BACKGROUND OF THE INVENTION

Modern electric vehicles generally allow two charging modes. A vehicle has a so-called on-board charging device for charging at a desired AC voltage or three-phase socket, said charging device controlling both the required conversion to direct current and a charging operation of a battery comprised by the vehicle. However, such an AC charging mode is extremely restricted in terms of charging speed on account of the connection power available, generally not more than 16 A or 32 A, and on account of an installation of the charging device with sufficient power. In modern electric vehicles, this results in charging times of several hours to be able to travel 100 km.

On account of the long charging times for AC charging, DC voltage charging, that is to say so-called DC charging, has been developed. In contrast to AC charging, in this case the vehicle does not have its own on-board charging device. Instead, a charging column or charging station outside the vehicle carries out the charging process and thus likewise forms current and voltage, as is necessary for charging the battery of the vehicle. During the charging process, DC charging lines that are to be provided are connected directly to poles of the battery, that is to say to the high-voltage battery of the vehicle. There is generally no DC isolation between the DC charging lines and the battery. Powers of DC charging stations are currently up to 50 kW. It is now desirable to achieve powers of up to 300 kW in order to surpass charging speeds of more than 20 km/min. Furthermore, a charging voltage of up to 1000 V is sought in order to achieve a corresponding charging speed. Recharging during travel is thus intended to be brought to orders of magnitude that users are used to from filling up vehicles with internal combustion engines. Exemplary details regarding DC charging and corresponding processes in a charging system and in a vehicle are described in DIN EN 61851, for example.

There is provision for vehicles to be enhanced for enabling higher charging speeds from the previously usual 400 V to at least 800 V, which can correspond approximately to a working range of 600 V to 950 V, sometimes even of 420 V to 980 V, on account of a voltage that is dependent on the state of charge and a certain variance in one configuration of the battery. A higher power can be transferred given the same current on account of the high voltage. In this way, the reduced charging period can be used to solve one of the main problems of electric vehicles.

In the event that charging columns use the mentioned high voltages of up to 1000 V and at the same time the corresponding charging columns are generally available in locations directly accessible for vehicles, there is the risk that the charging columns are damaged by vehicles or other mobile units, such as, for example, even animals etc., or the columns are damaged by other instances of vandalism. In this case, on account of the high voltages, it is not possible to ensure that no components of the charging columns are damaged, as a result of which there may possibly be a high risk for a user originating from the damaged charging columns.

In the prior art, concepts for blocking direct access to charging columns for vehicles are known.

Furthermore, various concepts for identifying collision and/or vandalism are known.

JP 2010-263666 A, which is incorporated by reference herein, for example, discloses a charging station, which comprises a circuit breaker, which breaks a circuit as soon as a collision is detected by collision detection sensors as an instance of collision acceleration.

DE 10 2011 076 183 A1, which is incorporated by reference herein, discloses an arrangement and a method for protecting an electrical connection against disturbances. To this end, a disturbance detector is provided which detects, for example, moisture on electrical contacts of a plug or on a surface on an induction plate, whereupon the charging process is interrupted or the process is continued with a reduced charging power.

US 2013/0193918 A, which is incorporated by reference herein, discloses providing a detector unit, using which a fault in the charging station, in the electric vehicle or in a connection between the charging station and the electric vehicle can be identified. In this case, the mentioned fault comprises incorrect positioning of the electric vehicle relative to the charging station, an incorrect position of the charging arm, a temperature outside of a desired scope or a current outside of a desired range.

SUMMARY OF THE INVENTION

In view of the foregoing, it would be desirable to minimize a potential risk that may originate from the charging columns on account of damage, even when using charging columns with voltages of up to 1000 V and without having to restrict the accessibility thereof with respect to vehicles to be charged.

Disclosed herein is a sensor for identifying a mechanical deformation of a housing of a charging column configured to charge an electrical energy store of an electrically driven vehicle, wherein the sensor at least comprises: a mechanically stable elongated arm having a first end portion arranged in the longitudinal orientation and a second end portion opposite the first end portion in the longitudinal orientation, wherein the arm is connected at its first end portion to a base of the charging column and runs in the longitudinal orientation, that is to say in the direction toward the second end portion, approximately parallel to a part of the charging column that is sensitive to deformations of the housing, in particular to a side wall of the housing, an electrical probe element, which is arranged on the second end portion of the arm, and an activation element, which is connected to the part of the charging column that is sensitive to deformations of the housing and is configured to activate the electrical probe element, and which is arranged in the region of the electrical probe element in such a way that, in a normal state of the housing, said activation element permanently activates the electrical probe element and, in the presence of a deformation of the housing, said activation element automatically deactivates the electrical probe element.

In one possible configuration, the electrical probe element comprises a contact area, upon the contacting of which, in particular by the activation element, the electrical probe element becomes or is activated.

In a further configuration, the areal extent of the contact area of the electrical probe element is selected to be of just such a size that an unintended temporary deformation of the arm and/or a deformation of the arm and/or of the part of the charging column that is sensitive to deformations of the housing do not trigger automatic deactivation of the electrical probe element on account of thermal fluctuations.

In a further configuration, the arm is produced from steel, aluminum or a combination thereof.

In yet a further configuration, the activation element comprises an adjusting element, in particular in the form of a screw, by means of which an impression depth of the electrical probe element, said impression depth being provided for the purpose of activation, can be aligned.

Although there is provision, in the normal state of the housing, for the activation element provided in accordance with aspects of the invention to permanently activate the electrical probe or the electrical probe element, said activation element is not fixedly mechanically connected to the arm or to the electrical probe element. The contact area of the electrical probe element or the bearing area provided is in this case kept as small as possible but large enough to tolerate unintended temporary deformations of the arm and also thermal fluctuations, which can be caused, for example, by weather in the summer and in the winter.

The part of the charging column that is sensitive to deformations of the housing is preferably not a structural part of the charging column but a part whose position is dependent on a mechanical integrity of the entire structure of the charging column.

The adjusting element of the activation element provided in one configuration also serves, in addition to aligning an impression depth of the electrical probe element, to carry out tests in the case of an inspection possibly to be carried out.

In a further configuration, in the deactivated state, the contact area of the electrical probe element rises upward at least to such an extent that reactuation or reactivation in the case of an arm or activation element that has been bent back is unlikely. This means that when the electrical probe element has been automatically deactivated once, the electrical probe element can no longer be automatically activated by the activation element. This is intended to prevent a situation in which, in the case of a deformation of the housing of the charging column and after the deactivation of the electrical probe element provided as desired, reactivation of the electrical probe element is not inadvertently possible, as a result of which the deformation of the housing of the charging column is possibly assumed to not have occurred or to not be present on account of the reactivation of the electrical probe element.

In a further configuration, the sensor according to aspects of the invention further comprises a first electrical contact, which is arranged relative to the electrical probe element in such a way that it is closed by the electrical probe element upon activation of the electrical probe element and it is automatically opened upon deactivation of the electrical probe element.

In one preferred embodiment, the electrical probe element is an electrical switch, which closes the first electrical contact upon impression of the contact area comprised by the electrical switch and opens the first electrical contact upon release of the contact area. This first electrical contact is preferably integrated into a so-called pilot line, which, as a current loop, is fed, for example, with a current by a safety unit and the electrical integrity of which is continuously monitored by a control unit. Said current loop comprises, in addition to the mentioned electrical probe element and the first electrical contact, further safety contacts in series. In the case of one of these safety contacts being interrupted, an immediate discharge at least of the most exposed part of the high-voltage-carrying parts and/or components of the charging column is triggered. This is generally done without software in order to guarantee functional safety requirements of a stricter Safety Integrity Level (SIL) in accordance with IEC 61508.

In a further configuration the electrical probe element comprises a second electrical contact, which, upon deactivation of the electrical probe element, automatically changes its state, that is to say is either opened or closed, depending on which state it was in when the probe element was activated, which is monitored by an integrated circuit of a charging column control system, generally by a digital input. The integrated circuit can be, in particular, a microcontroller of the charging column control system. In this case, said monitoring is carried out by software. Software detection of this kind makes it possible to identify the detected fault and it can also identify the time when the fault occurred and make a connection to further data, for example from customers, charging processes, vehicle types, weather, camera images or videos in a logbook entry, said data being collected in a charging park comprising the charging column.

Also described herein is a charging column having the above-described sensor.

Furthermore, a method for identifying a mechanical deformation of a housing of a charging column configured to charge an electrical energy store of an electrically driven vehicle is claimed, in which an above-described sensor is provided on the charging column.

The sensor provided in accordance with aspects of the invention makes it possible to detect damage of the housing of the charging column due to a mechanical deformation of the housing of just a few millimeters. The sensor according to aspects of the invention further enables simple detection of the charging column being bent over, the charging column being partly broken off from its base, a side wall of the charging column being deformed, a structuring side frame of the charging column being deformed as well as large impacts being exerted on the charging column.

Furthermore, the function of the sensor according to aspects of the invention can also be easily tested during a service.

Further advantages and configurations of the invention emerge from the description and from the appended drawing.

It is self-evident that the features mentioned above and the features yet to be discussed below may be used not only in the respectively specified combination but also in other combinations or individually without departing from the scope of the present invention.

BRIEF DESCRIPTION OF THE DRAWINGS

The invention is schematically illustrated in the drawing with reference to an embodiment and is described in detail with reference to the drawing.

The figures are described cohesively and comprehensively and the same components are assigned to the same reference symbols.

DETAILED DESCRIPTION OF THE INVENTION

Figure 1:
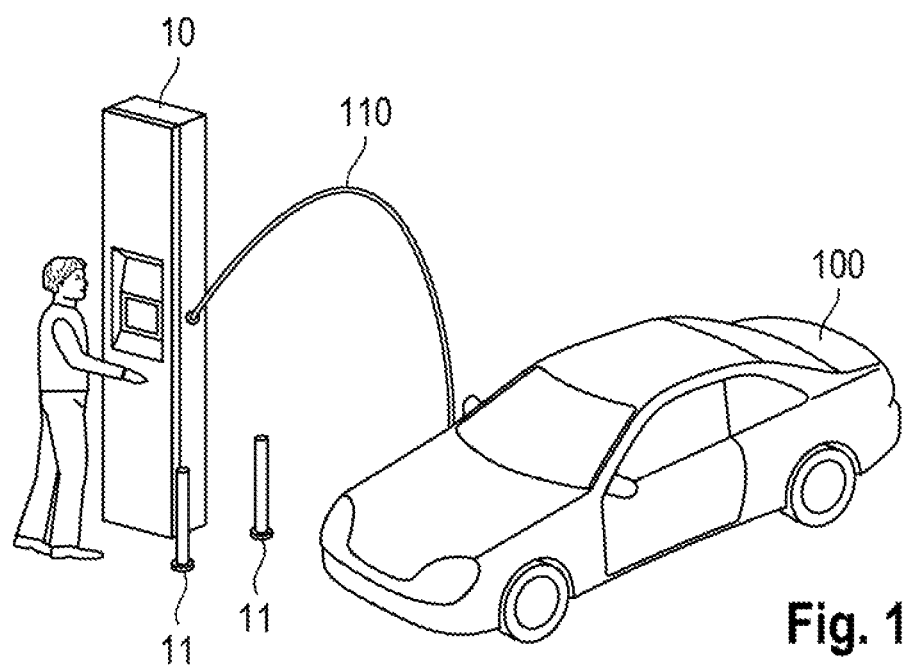
FIG. 1 shows an electric vehicle, which is connected to a charging column by a charging cable.

FIG. 1 shows an electric vehicle 100, which is connected to a charging column 10 by a charging cable 110. In the case of an extensive installation of charging columns 10, it should be assumed that, on the one hand, the charging columns will no longer have in each case a canopy, like in conventional filling stations and, further, a plurality of said charging columns are generally installed in charging parks, which are intended to be freely accessible for the respective vehicles to be charged. As a result, the charging columns 10, the charging cable 110 and the electric vehicle 100 are always located in the open, where they are exposed to all conceivable external influences. Since it is sought, at the same time, to enhance vehicles to enable higher charging speeds from the previous 400 V to 800 V, charging columns, in particular fast DC charging columns, which use voltages of up to 1000 V are provided. On account of the high voltage, a higher power can be transmitted at the same current, which is associated with a substantially shorter charging period. Since the charging columns are now intended to be provided in locations directly accessible for vehicles to be charged, the danger of vehicles damaging the charging columns or of charging columns being damaged by vandalism or other external influences is high, even when small columns 11 are provided to prevent a collision of a vehicle. On account of the high voltages intended to be provided by the charging columns, the danger of damaged components of the charging column in the case of damage to a respective charging column possibly being extremely dangerous for the environment is particularly high here.

Figure 2:
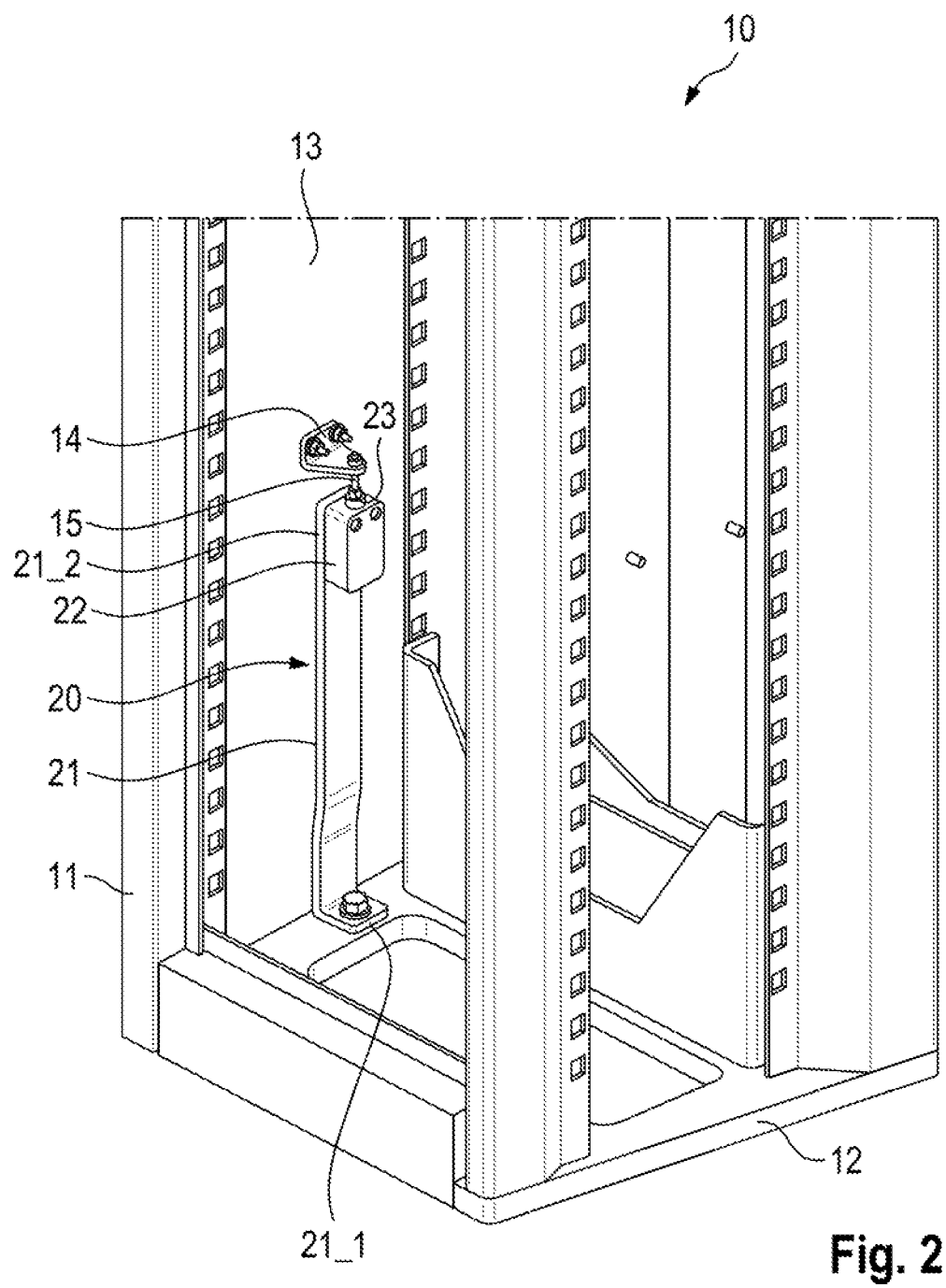
FIG. 2 shows a schematic illustration of a section of a charging column having one embodiment of the sensor according to aspects of the invention.
Figure 3:
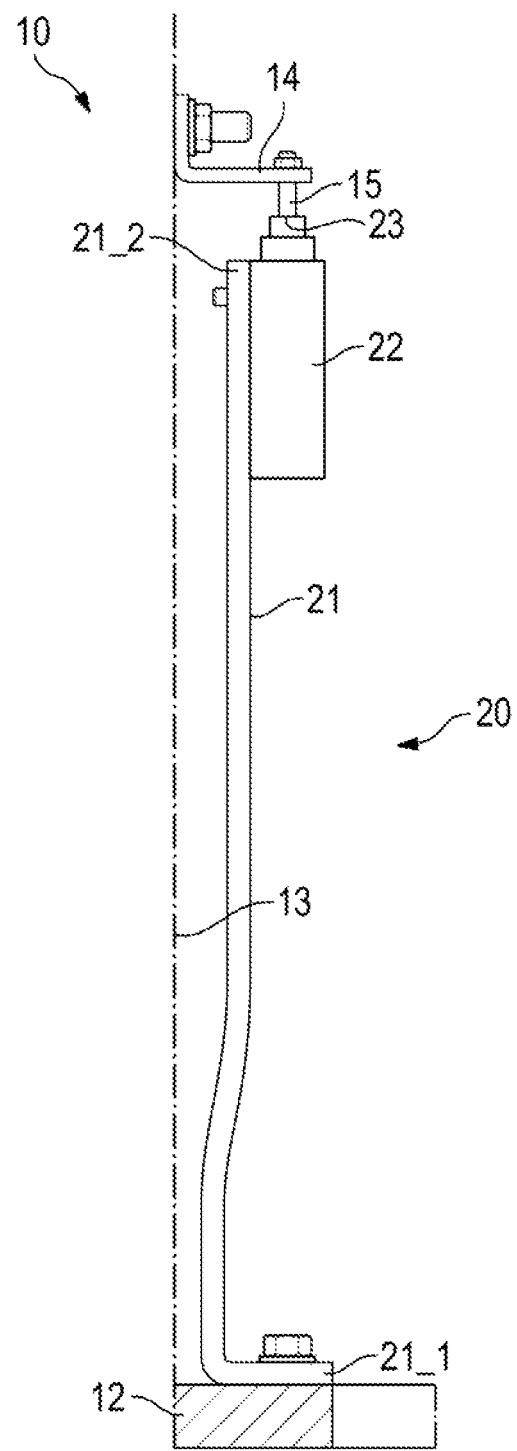
FIG. 3 shows a schematic sectional illustration of the charging column from FIG. 2 having one embodiment of the sensor according to aspects of the invention.

FIG. 2 now shows a section of a charging column 10 in which one embodiment of a sensor 20 according to aspects of the invention is arranged. The sensor 20 is provided to identify a mechanical deformation of a housing 11 of the charging column 10 configured to charge an electrical energy store of an electrically driven vehicle. The sensor 20 comprises a mechanically stable elongated arm 21 having a first end portion 21_1 arranged in the longitudinal orientation and a second end portion 21_2 opposite the first end portion 21_1 in the longitudinal orientation. The arm 21 is connected at its first end portion 21_1 to a base 12 of the charging column 10. A screw connection is provided here for the purpose of connection. In the embodiment illustrated here, the arm 21 is arranged in the longitudinal orientation approximately parallel to a side wall 13 of the housing 11. The side wall 13 of the housing 11 represents a part of the charging column 10 that is sensitive to deformations of the housing. The sensor 20 further comprises an electrical probe element 22, which is arranged on the second end portion 21_2 of the arm 21. Furthermore, the sensor 20 comprises an activation element 14, which is connected to the side wall 13 of that charging column 10 that is sensitive to deformations of the housing 11 and is configured to activate the electrical probe element 22. To this end, the activation element 14 is arranged in the region of the electrical probe element 22 in such a way that, in a normal state of the housing 11, as is illustrated in FIG. 2, said activation element permanently activates the electrical probe element 22. To this end, the electrical probe element 22, as can be seen more clearly in FIG. 3, comprises a contact area 23, upon contacting of which the electrical probe element 22 becomes or is activated.

In the embodiment shown here, the electrical probe element 22 is embodied as a switch, the contact area 23 of which is to have a force or a pressure applied to it for the purpose of activation, as a result of which the contact area 23 is impressed. The contact area 23 is impressed here by an adjusting element 15 of the activation element 14, which adjusting element may be embodied, for example, as a screw and can thereby also be suitably aligned in terms of its height relative to the contact area. The areal extent of the contact area 23 is selected to be of just such a size that an unintended temporary deformation of the arm 21 and/or a deformation of the arm 21 and/or of the side wall 13 do not trigger automatic deactivation of the electrical probe element 22 on account of thermal fluctuations. This means that even if slight deformations of the side wall 13, for example to the right or to the left in FIG. 3, or of the arm 21, to the right or to the left in FIG. 3, were to cause the adjusting element 15 to shift on the contact area 23, in the case of slight fluctuations, the adjusting element 15 still remains bearing on the contact area 23 and thus contacts the contact area 23 in an unchanged manner. Only if relatively great deformations of the side wall 13 or of the arm 21 should arise does the adjusting element 15 lose the contact with the contact area 23, such that the contact area 23 impressed by the adjusting element 15 in the normal state, as illustrated by the arrow 33, then extends upward to a released position and is thus no longer impressed by the adjusting element. If the deformation of the side wall 13 and/or of the arm 21 were to be corrected again, it is, however, not automatically possible for the adjusting element 15 of the activation element 14 to impress the contact area 23 again, since the released state of the contact area 23 is such that a slight sliding back of the adjusting element 15 onto the contact area 23 is virtually prevented. Further safety is intended to be ensured thereby, namely that, after deformation of the charging column, during proper maintenance of the charging column, the sensor is realigned and only then can be used again.

The arm 21 is produced from steel, aluminum or a combination of steel and aluminum. In the embodiment shown here, the part of the charging column 10 that is sensitive to deformation and to which the activation element 14 is to be mounted is a side wall, but can generally be any part of the charging column 10 whose position is dependent on the mechanical integrity of the entire structure of the charging column 10. The screw 15 illustrated here that is provided in the activation element 14 also permits, in addition to alignment of an impression depth of the contact area 23 of the probe element 22, tests in the case of an inspection or maintenance that is to be carried out.

As already mentioned, in the open state of the probe element 22, the contact area 23 rises to such an extent that reactuation or reactivation cannot take place automatically after a deformation of the charging column 10 and of the arm 21 has been corrected.

Figure 4:
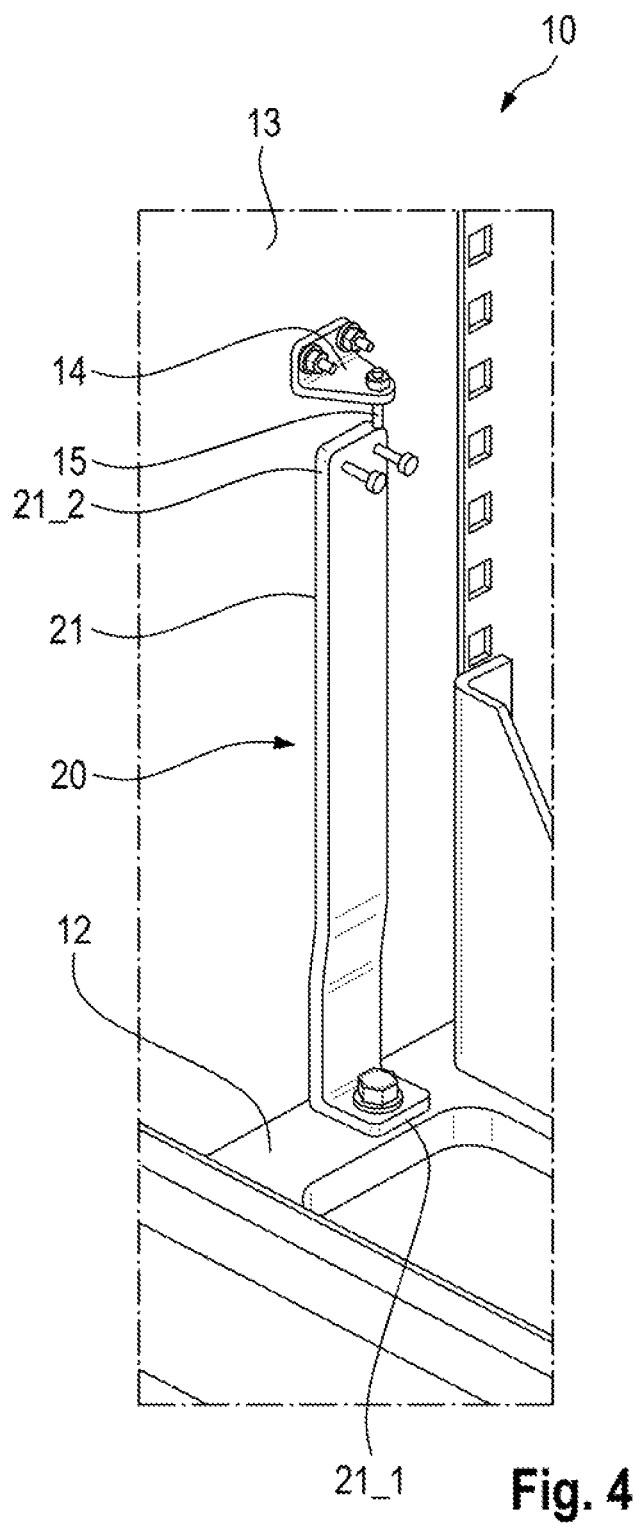
FIG. 4 shows a schematic illustration of a further section of the charging column from FIG. 2 having an arrangement of parts of one embodiment of the sensor according to aspects of the invention.

FIG. 4 again shows a schematic illustration of a section of the charging column 10, wherein in this case the sensor 20 is shown only with some of its components, namely the arm 21, having its first end portion 21_1 and its second end portion 21_2, and the activation element 14 having the adjusting element 15. The electrical probe element 22 is not illustrated here. The arm 21 is screwed at its first end portion 21_1 to the base 12 of the charging column 10. The arm 21 runs substantially parallel to the side wall 13 of the charging column 10. There are two screws provided here on the top, or second, end portion 21_2 of the arm 21, using which screws the electrical probe element (not illustrated here) can be secured to the second end portion 21_2. The activation element 14 is secured to the side wall 13 and is fixedly screwed to said side wall by two screws. A screw is provided here on the activation element 14 as an adjusting element 15, which screw is to be adjusted relative to the contact area 23 of the electrical probe element 22 in such a way that, in the normal state, that is to say when the charging column is not damaged, the electrical probe element is permanently activated, that is to say that the contact area 23 is permanently impressed by the adjusting element 15 and as a result closes or keeps closed a further provided first electrical contact.

As already mentioned, the electrical probe element 22 is preferably embodied as an electrical switch, which, upon impression, of the contact area 23, for example, by the adjusting element 15, closes the first electrical contact and, upon release, opens it. Said first electrical contact is preferably integrated into a so-called pilot line (not illustrated here). The pilot or safety line is generally a series circuit that is to have a current to be controlled applied to it, said series circuit being composed of units that monitor individual components of a charging park, said units each comprising at least one relay or one switch. In normal operation, all the relays are closed. In the case of one of these switches being interrupted or opened, a discharge at least of a most exposed part of the high-voltage-carrying parts and/or the components of the charging column is triggered. The electrical integrity of the pilot line is constantly monitored by a safety unit, by means of which ultimately the integrity of the charging column is also continuously monitored.

The electrical probe element 22 can have a further, that is to say a second, electrical contact, which is either opened or closed when the adjusting element 15 loses contact with the contact area 23. Said second contact (not illustrated here) is preferably monitored by an integrated circuit, in particular a microcontroller, of a charging column control system using software by way of a digital input. The software detection of a deformation makes it possible to accurately identify a cause of a fault and to connect to further data collected in the charging park.

The illustrated charging column 10 having the sensor 20 according to aspects of the invention makes it possible to detect damage of the housing 11 due to a mechanical deformation of the housing 11 of just a few millimeters. In this case, it is possible to easily realize simple detection of the charging column 10 being bent over, the charging column 10 being partly broken off from its base 12, the side wall 13 of the charging column 10 being deformed and/or a structuring side frame of the charging column 10 being deformed as well as large impacts being exerted on the charging column 10.

Furthermore, the functionality of the sensor can also be easily tested during a service.

What is claimed is:

1. A sensor for identifying a mechanical deformation of a housing of a charging column that is configured to charge an electrical energy store of an electrically driven vehicle, the sensor comprising:
   an elongated arm having a first end portion arranged in a longitudinal orientation and a second end portion opposite the first end portion in the longitudinal orientation, wherein the elongated arm is connected at the first end portion to the charging column and runs in the longitudinal orientation approximately parallel to a part of the charging column that is sensitive to deformations of the housing;
   an electrical probe element arranged on the second end portion of the arm; and
   an activation element arranged in a region of the electrical probe element and connected to the part of the charging column that is sensitive to deformations of the housing;
   wherein:
      the activation element is configured to activate the electrical probe element in such a way that, in a normal undeformed state of the housing, said activation element permanently activates the electrical probe element, and, in the presence of a deformation of the housing, said activation element automatically deactivates the electrical probe element,
      the electrical probe element comprises a contact area,
      the electrical probe element becomes or is activated upon being contacted at the contact area by the activation element, and
      an areal extent of the contact area is selected to be of such a size that a deformation of the arm or of the part of the charging column that is sensitive to deformations of the housing do not trigger automatic deactivation of the electrical probe element on account of thermal fluctuations.

2. The sensor as claimed in claim 1, wherein the arm is connected at the first end portion to a base of the charging column.

3. The sensor as claimed in claim 1, wherein the electrical probe element comprises a contact area, and wherein the electrical probe element becomes or is activated upon being contacted at the contact area by the activation element.

4. The sensor as claimed in claim 1, wherein the arm is produced from steel, aluminum or a combination thereof.

5. A sensor for identifying a mechanical deformation of a housing of a charging column that is configured to charge an electrical energy store of an electrically driven vehicle, the sensor comprising:
   an elongated arm having a first end portion arranged in a longitudinal orientation and a second end portion opposite the first end portion in the longitudinal orientation, wherein the elongated arm is connected at the first end portion to the charging column and runs in the longitudinal orientation approximately parallel to a part of the charging column that is sensitive to deformations of the housing;
   an electrical probe element arranged on the second end portion of the arm; and
   an activation element arranged in a region of the electrical probe element and connected to the part of the charging column that is sensitive to deformations of the housing;
   wherein:
      the activation element is configured to activate the electrical probe element in such a way that, in a normal undeformed state of the housing, said activation element permanently activates the electrical probe element, and, in the presence of a deformation of the housing, said activation element automatically deactivates the electrical probe element, and the activation element comprises an adjusting element for aligning an impression depth of the electrical probe element, the impression depth being provided for the purpose of activation of the electrical probe element.

6. A sensor for identifying a mechanical deformation of a housing of a charging column that is configured to charge an electrical energy store of an electrically driven vehicle, the sensor comprising:

an elongated arm having a first end portion arranged in a longitudinal orientation and a second end portion opposite the first end portion in the longitudinal orientation, wherein the elongated arm is connected at the first end portion to the charging column and runs in the longitudinal orientation approximately parallel to a part of the charging column that is sensitive to deformations of the housing;

an electrical probe element arranged on the second end portion of the arm; and an activation element arranged in a region of the electrical probe element and connected to the part of the charging column that is sensitive to deformations of the housing; wherein:

the activation element is configured to activate the electrical probe element in such a way that, in a normal undeformed state of the housing, said activation element permanently activates the electrical probe element, and, in the presence of a deformation of the housing, said activation element automatically deactivates the electrical probe element, and the sensor is configured such that the electrical probe element can no longer be automatically activated by the activation element after automatic deactivation by the activation element.

7. A sensor for identifying a mechanical deformation of a housing of a charging column that is configured to charge an electrical energy store of an electrically driven vehicle, the sensor comprising:

an elongated arm having a first end portion arranged in a longitudinal orientation and a second end portion opposite the first end portion in the longitudinal orientation, wherein the elongated arm is connected at the first end portion to the charging column and runs in the longitudinal orientation approximately parallel to a part of the charging column that is sensitive to deformations of the housing;

an electrical probe element arranged on the second end portion of the arm;

an activation element arranged in a region of the electrical probe element and connected to the part of the charging column that is sensitive to deformations of the housing; and a first electrical contact arranged relative to the electrical probe element in such a way that the first electrical contact is closed by the electrical probe element upon activation of the electrical probe element and is automatically opened upon deactivation of the electrical probe element;

wherein:

the activation element is configured to activate the electrical probe element in such a way that, in a normal undeformed state of the housing, said activation element permanently activates the electrical probe element, and, in the presence of a deformation of the housing, said activation element automatically deactivates the electrical probe element, the electrical probe element comprises a second electrical contact, which, upon deactivation of the electrical probe element, automatically changes state to either opened or closed, and the sensor further comprises an integrated circuit of a charging column control system for monitoring the change of state.

8. The sensor as claimed in claim 7, wherein the first electrical contact is integrated into a pilot line.

9. The sensor as claimed in claim 7, wherein the electrical probe element is an electrical switch that closes the first electrical contact upon impression of a contact area comprised by the electrical switch and opens the first electrical contact upon release of the contact area.

10. A charging column having the sensor as claimed in claim 1.

11. A method for identifying a mechanical deformation of a housing of a charging column comprising:

deploying a sensor for identifying a mechanical deformation of a housing of a charging column that is configured to charge an electrical energy store of an electrically driven vehicle, the sensor comprising:

an elongated arm having a first end portion arranged in a longitudinal orientation and a second end portion opposite the first end portion in the longitudinal orientation, wherein the elongated arm is connected at the first end portion to the charging column and runs in the longitudinal orientation approximately parallel to a part of the charging column that is sensitive to deformations of the housing, wherein the elongated arm runs in the longitudinal orientation approximately parallel to the part of the charging column that is sensitive to deformations of a side wall of the housing, an electrical probe element arranged on the second end portion of the arm, and an activation element arranged in a region of the electrical probe element and connected to the part of the charging column that is sensitive to deformations of the housing;

activating the electrical probe element using the activation element in such a way that, in a normal state of the housing, the activation element permanently activates the electrical probe element and, in the presence of a deformation of the housing, said activation element automatically deactivates the electrical probe element.

12. The sensor as claimed in claim 1, wherein the elongated arm is mechanically stable.

13. A sensor for identifying a mechanical deformation of a housing of a charging column that is configured to charge an electrical energy store of an electrically driven vehicle, the sensor comprising:

an elongated arm having a first end portion arranged in a longitudinal orientation and a second end portion opposite the first end portion in the longitudinal orientation, wherein the elongated arm is connected at the first end portion to the charging column and runs in the longitudinal orientation approximately parallel to a part of the charging column that is sensitive to deformations of the housing;

an electrical probe element arranged on the second end portion of the arm; and an activation element arranged in a region of the electrical probe element and connected to the part of the charging column that is sensitive to deformations of the housing;

wherein:
the activation element is configured to activate the electrical probe element in such a way that, in a normal undeformed state of the housing, said activation element permanently activates the electrical probe element, and, in the presence of a deformation of the housing, said activation element automatically deactivates the electrical probe element, and the elongated arm runs in the longitudinal orientation approximately parallel to the part of the charging column that is sensitive to deformations of a side wall of the housing.

\* \* \* \* \*